United States Patent [19]

Quartana, III et al.

[11] Patent Number: 5,299,598
[45] Date of Patent: Apr. 5, 1994

[54] CHECK VALVE

[75] Inventors: Anthony J. Quartana, III, New Orleans; Ray A. Guccione, Sr., Marrero, both of La.

[73] Assignee: Cross Pump International, Belle Chasse, La.

[21] Appl. No.: 909,986

[22] Filed: Jul. 2, 1992

[51] Int. Cl.[5] ............................................... F16K 15/02
[52] U.S. Cl. .................................. 137/540; 137/516.29
[58] Field of Search .......................... 137/516.29, 540

[56] References Cited

U.S. PATENT DOCUMENTS

| | | | |
|---|---|---|---|
| 1,322,938 | 11/1919 | Parker | 137/540 X |
| 1,443,675 | 1/1923 | Bowler | 137/540 |
| 2,481,482 | 9/1949 | Green | 137/516.29 X |
| 2,912,000 | 11/1959 | Green | 137/516.29 |
| 2,912,001 | 11/1959 | Green | 137/516.29 |
| 3,580,275 | 5/1971 | Hanson | 137/516.29 |
| 3,735,777 | 5/1973 | Katzer | 137/540 X |

*Primary Examiner*—Robert G. Nilson
*Attorney, Agent, or Firm*—Keaty & Keaty

[57] ABSTRACT

A check valve is disclosed for permitting a fluid flow in a generally one direction. The check valve is provided with an elongated housing with a central passageway within which a valve member moves for permitting a fluid flow in one direction and for closing a fluid communication when moving in an opposite direction. The valve member has a conically-shaped groove for receiving a sealing member therein. When the sealing member becomes expanded under the influence of fluids passing through the check valve, it is allowed to move from the groove along a neck of the valve member. The interior wall housing is provided with plurality of longitudinal grooves extending in parallel relationship to a central axis of the housing in that part of the housing wherein the valve member moves. The longitudinal grooves ensure fluid flow through the valve member at all times.

28 Claims, 2 Drawing Sheets

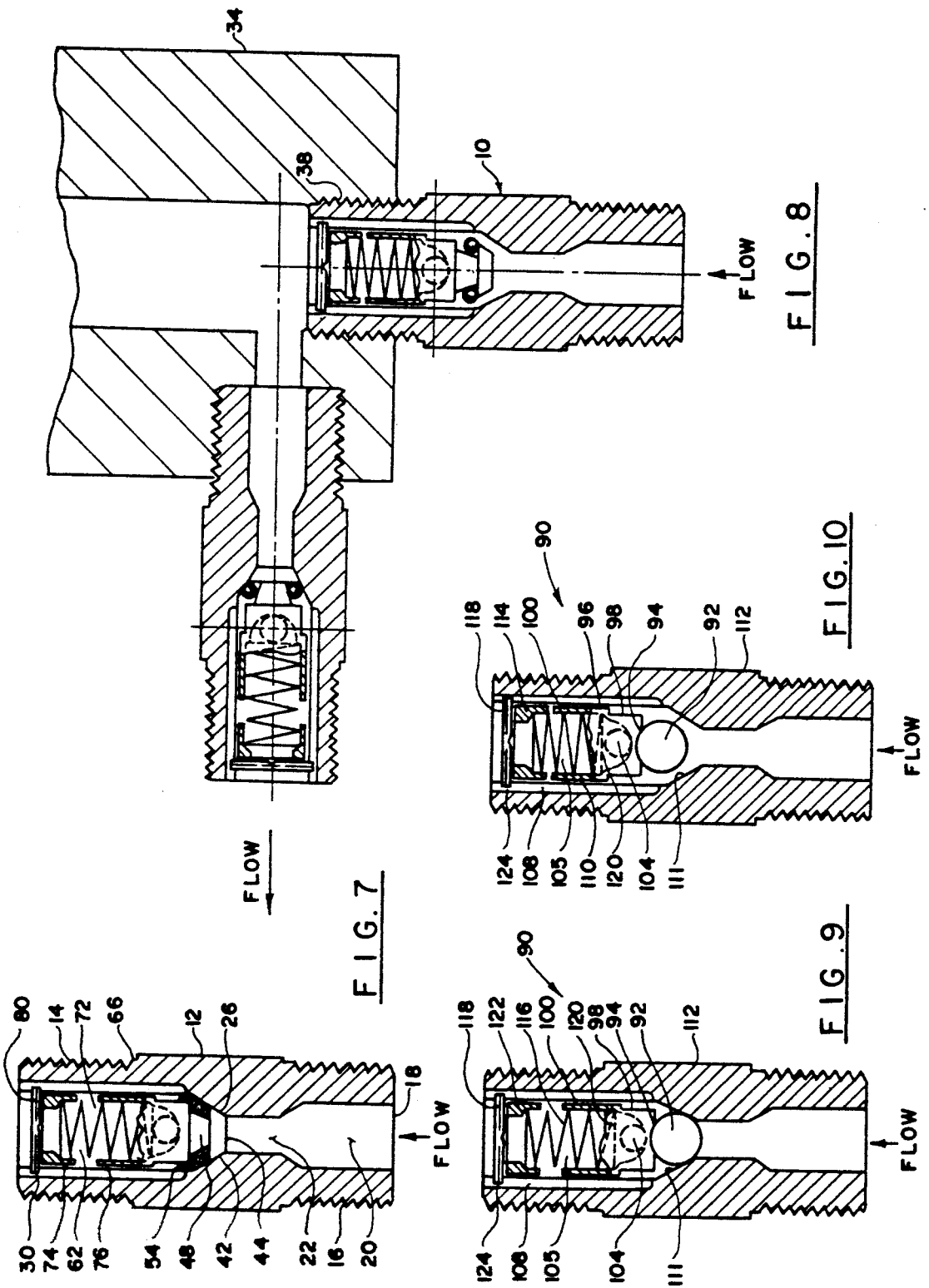

CHECK VALVE

BACKGROUND OF THE INVENTION

This invention relates to check valves for controlling the flow of fluids, and more particularly it relates to a check valve of a poppet type which permits a flow of fluid in one direction and closes the check valve under the influence of a back pressure.

A variety of check valves have been used in the oil industry for controlling the flow of production fluid and of various additives utilized in the field to promote the production rate.

The valves in such an environment are subject to considerable wear and exposure to abrasive, often destructive fluids which can cause damage to non-metal elements of the check valves, such as seals, conventionally made of synthetic or natural elastic materials.

In order to protect the seals and insure longer operational life of the valves, it has been suggested to limit the exposure of the seals, such as O-rings, to the harmful effects of the fluids passing through the check valve. Examples of such technical approach are disclosed in U.S. Pat. No. 2,481,482 issued on Sep. 13, 1949 to D. C. Green and U.S. Pat. No. 2,912,000 issued on Nov. 10, 1959 to D. C. Green.

It has been noted that conventional valves utilized in the field have a common problem of the O-ring's "swelling" under the influence of the destructive fluids, which leads to damage or mutilation of the O-ring and eventually results in disintegration of the O-ring piece-by-piece. The chipped away pieces then block the fluid passageway of the check valve.

It was also noted that conventional check valves sometimes last as little as a few days, depending on the composition of the fluid the flow of which the check valve controls, thereby directly affecting the cost of the operation.

The present invention, therefore, contemplates elimination of the drawbacks associated with the prior art and provision of a check valve with improved sealing capabilities.

SUMMARY OF THE INVENTION

It is a general object of the present invention to provide a check valve having an improved sealing capabilities.

It is another object of the invention to provide a check valve which has a moving seal traveling inside the valve body.

It a further object of the present invention to provide a check valve having extended service life.

These and other objects are achieved through a provision of a check valve which comprises a housing with a central fluid flow passageway extending therethrough. A valve member moves in the central passageway between a position sealing fluid communication through the central passageway and a position permitting a fluid flow therethrough.

The valve member has a conical forward end which sits against a matchingly inclined conical valve seat formed within the central passageway. A groove which receives a sealing O-ring is formed by a tapered stem of the valve member.

When the O-ring expands under the influence of the fluids passing through the valve, it slides from the stem of the valve member to the neck of the valve member, or poppet and travels, to a limited degree, in circumferential relationship about the neck.

A transverse enlarged diameter shoulder is formed on a main body of the valve member, between the main body and the neck. The shoulder limits the distance of travel of the O-ring along the valve member neck.

A compression coil spring continuously urges the valve member into a seated position within the housing, while the second end of the coil spring abuts a retainer which fittingly seats within the housing.

A resilient non-continuous snap ring fits within an annular groove formed within the inner wall of the housing in transverse relationship to a longitudinal axis of the housing. The snap ring abuts the opposite surface of the retainer and insures position of the valve member within the housing.

A plurality of longitudinal grooves are formed in the interior wall of the housing and extend a distance from the conical valve seat formed in the housing and against which the valve member seats. The longitudinal grooves are oriented in substantially parallel relationship to a longitudinal axis of the housing. The longitudinal grooves facilitate a fluid flow about the valve member body even when the O-ring swells and seals against the interior wall of the housing.

In an alternative embodiment, the valve member is provided with a ball-shaped closing element which sits in a proportionally sized and shaped seat formed in the forward end of the valve member. Similar longitudinal grooves formed in the interior wall of the housing in a parallel relationship to the central longitudinal axis of the housing assist in fluid communication through the check valve at all times.

These and other features and objectives of the present invention will become apparent to those skilled in the art from the following detail description of the invention.

BRIEF DESCRIPTION OF THE DRAWINGS

Reference will now be made to the drawings, wherein like parts are designated by like numerals, and wherein

FIG. 7 illustrates the O-ring in an extremely swollen condition with the valve closed.

FIG. 8 illustrates exemplary connection of the valve of FIGS. 1-7 to an injection head.

FIG. 9 illustrates another embodiment of the valve utilizing a ball as a closing element, with the valve in an open position; and FIG. 10 illustrates the valve of FIG. 9 in a closed position.

DETAIL DESCRIPTION OF THE PREFERRED EMBODIMENT

Figure 1:
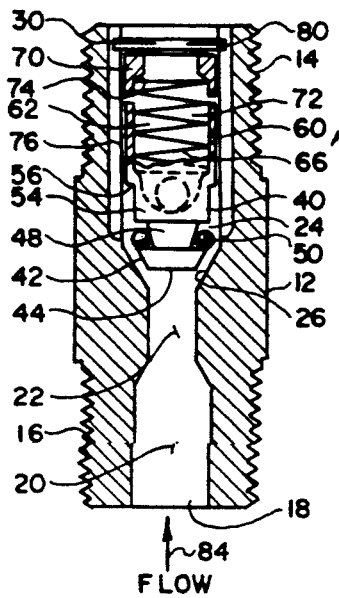
FIG. 1 is a perspective, partially sectional view of the check valve in accordance with the first embodiment of the present invention in an open position.

Turning now to the drawings in more detail, numeral 10 designates the check valve in accordance with the present invention. The valve 10 comprises a valve housing 12 having a first externally threaded end 14 and a second externally threaded end 16. The valve housing 12 is provided with a central bore 18 which defines a central fluid passageway of the valve 10.

The bore 18 has a first annular portion 20, a second annular restricted diameter portion 22 and a third portion 24, which has a diameter greater than the diameters of the first portion 20 or the second portion 22.

A conical valve seat 26 is formed in the area of connection between the housing portions 22 and 24 by an inwardly converging interior wall 76. A plurality of equidistantly spaced longitudinal grooves 28 are formed in that part of the portion 24 which extends a distance from the seat 26 towards the first end 14 of the housing 12.

The grooves 28 extend in a parallel relationship to a longitudinal central axis of the valve housing 12. The function of the grooves 28 and 30 will be explained in more detail hereinafter. The first end 14 of the valve housing 12 is adapted for connection to a fluid source, such as for example an injection head 34 (see FIG. 8). As can be seen in FIG. 8, the end 14 is connected to the injection head 34 through the use of matching threads 38.

Figures 2, 3:
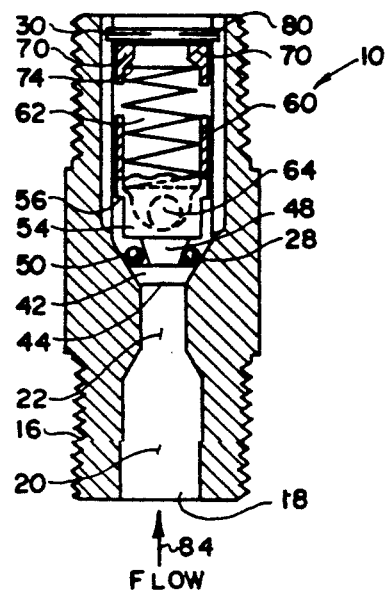
FIG. 2 is a top view of the valve of FIG. 1.
FIG. 3 is a sectional view showing the valve of FIGS. 1 and 2 in a closed position.

Mounted within the valve housing 12 is a valve member 40 which in the embodiment shown in FIG. 1 is a poppet carrying a valve head, or valve cone 42 on one of its ends. The valve cone 42 is slanted to match the angle of the valve seat 26, to allow the valve cone 42 to fit in the portion 24 and close the passageway 18, as illustrated in FIG. 3.

Figure 4:
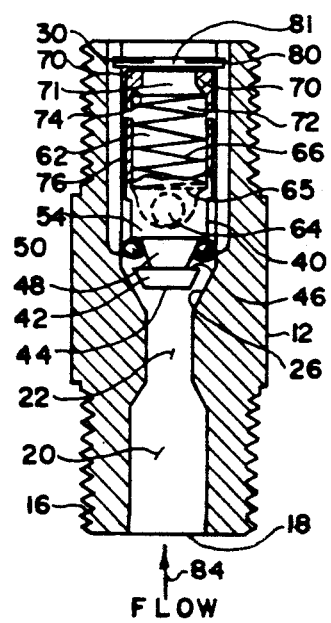
FIG. 4 is a sectional view illustrating a swollen O-ring, with the valve of FIGS. 1-3 in an open position.

The valve cone 42 has a first, forwardmost surface 44 and a second surface 46 which forms an enlarged annular shoulder 46 (see FIG. 4). Integrally formed with a valve cone 42 is a smaller conical part, or a stem 48, the tapered exterior of which defines a primary groove 52 (see FIG. 6) for receiving an O-ring seal 50 therein.

A generally cylindrically-shaped neck 54 is integrally connected to the stem 48. The neck 54 has an annular exterior surface of a diameter substantially similar to the diameter of the shoulder 46. The neck 54 is integrally formed with a main body 60 of the valve member 40. The main body 60 has an exterior diameter greater than the diameter of the neck 54, but slightly smaller than the diameter of the interior passageway portion 24. When the valve member 40 moves within the portion 24, the main body 60 frictionally engages the inner wall 76, which defines the passageway 24.

An enlarged diameter annular shoulder 56 is formed between the exterior surface of the neck 54 and the main body 60. The shoulder 56 limits the sliding movement of the swollen O-ring 50 along the neck 54.

A central axial opening 62 is formed in the body 60 in fluid communication with a transverse port 64 (see FIG. 4), through which the fluid is admitted into the valve member 40. The inlet ports 64 can be one or more in number, as desired. The port 64 communicates at a right angle with the opening 62 and allows the fluid to travel from the passageway 18 into the body 60.

The internal passageway 62 has a proximal annular end wall 65 a distance from the opening 64. The end wall 65 forms an abutment surface for a coil spring 66 which is mounted under tension between the poppet 40 and a retainer 70.

The retainer 70, has a generally cylindrical exterior surface and a cup-shaped spring receiving opening 72, which is defined by the inner walls of the retainer 70 and a spring abutting surface 74. An axial central fluid opening 71 is made in the body of the retainer 70.

The surface of the retainer 70 opposite the shoulder 74 is contacted by a non-continuous resilient split snap ring 80 which has a diameter suitable for engaging within a transverse annular groove 30 formed in the end 14 of the valve body 12 adjacent to its outermost edge. When assembled, as can be seen in FIG. 1, the snap ring 80 is fitted in the groove 30 and supports the retainer 70, which in turn, forces the poppet 40 into a closed position by exerting pressure on the coil spring 66.

As will be appreciated, the snap ring 80 is also provided with a central opening 81 that is co-axial with the opening 71 in the retainer 70, the opening 62 and the fluid passageway 18.

In operation, the check valve is designed to allow a fluid flow in one direction and to prevent a fluid flow in the opposite direction. In FIG. 1, a flow of fluid is allowed through the portion 20 of the passageway 18 in the direction of arrow 84. The valve member 40 is moved away from the seat 26, and the fluid travels through the port 64 into the opening 62 and through the longitudinal grooves 28 pass the valve member 40.

When the valve 10 is in its closed position, as illustrated in FIG. 3, the conical head 42 fits in the valve seat of the portion 24 and contacts the wall 26. The O-ring 50 is positioned within the groove 52. When any back pressure develops, it is communicated to the poppet 40 and forces the O-ring 50 to seal the communication between the interior of the valve housing 12 and exterior thereof.

However, the fluid communication is allowed within the housing 12 due to a provision of the longitudinal grooves 28, allowing the fluid to travel around the poppet 40 within the portion 24 of the housing. The fluid communication is prevented between the portion 24 and the portions 20 and 22 when the valve 10 is in the closed position, with the valve cone 42 seating against the seat 26 (as shown in FIGS. 3, 5 and 7).

Frequent changes in the direction of a fluid flow, the harmful effect of the chemical compositions passing through the check valve 10 and changes in the pressure rate eventually cause swelling of the O-ring 50, which will have a tendency to slide over the neck 54 in a direction towards the main body 60.

Figure 6:
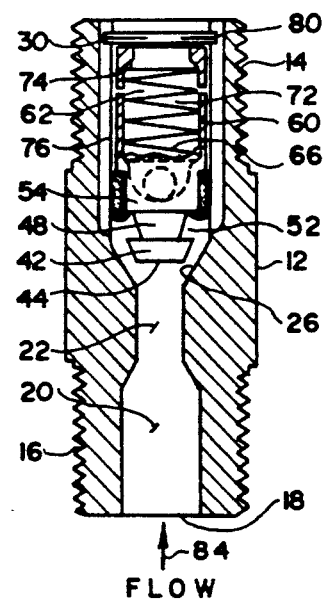
FIG. 6 is a sectional view illustrating the O-ring in an extremely swollen condition when the valve is open.

The travel of the swollen O-ring 50 along the neck 54 is limited by the shoulder 56, as can be better seen in FIG. 6. In actual operation, it is envisioned that the O-ring will position itself anywhere along the length of the neck 54, not necessarily reaching the shoulder 56.

Figure 5:
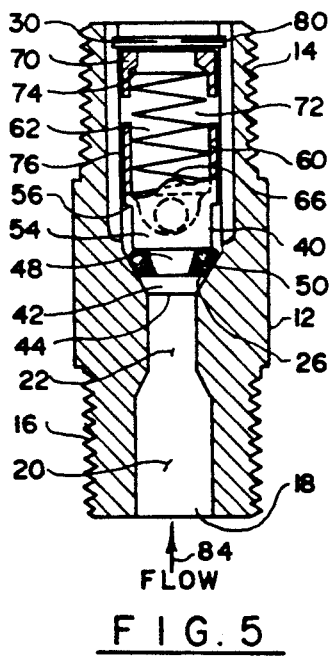
FIG. 5 is a sectional view illustrating a swollen O-ring with the valve in a closed position.

Turning now to FIG. 5, action of the swollen O-ring 50 will be addressed in more detail. When the valve 10 receives a back pressure with the O-ring 50 in a swollen condition, the valve member 40 will move towards the portion 22 of the passageway 18, and the cone head 42 will seat against the conical valve seat 26. The O-ring 50, in this case, will be squeezed back into the groove 52 under the influence of fluids passing through the passageway 24 in the direction opposite to that shown by arrow 84.

However, circulation of the fluid in the portion 24 continues through the provision of the longitudinal grooves 28. The port 64 may become blocked by the O-ring 50, since the O-ring is allowed to move from the groove 52 along the neck 54.

As will be appreciated, the tapered stem 48 assists in retaining the O-ring 50 in its sealing position within the groove 52. In an extremely swollen state, the O-ring 50 will be squeezed back into the groove 52 and will occupy even some space around the neck 54, when the valve is closed, as can be better seen in FIG. 7.

Turning now to the embodiment of FIGS. 9 and 10, a check valve 90 utilizing a closing element in the form of a spherical member 92 is illustrated. The ball 92 is designed to sit within a specially sized and shaped ball seat 94 formed in one end of a valve member 96.

The valve member 96 has a reduced diameter neck 98 and an enlarged diameter main body portion 100.

Similarly to the embodiment of FIGS. 1–8, a plurality of longitudinal grooves 108 are formed in the interior wall 110 of the housing 112 extending in a parallel relationship to the central longitudinal axis of the housing 112.

A central opening 105 is made in the body 100, the opening communicating with a transverse port 104 to permit a flow of fluid. The valve 90, similar to the valve 10, is provided with a retainer member 114 and a compression coil spring 116 (shown in a compressed state in FIG. 9 and a released state in FIG. 10), urging the ball valve member 96 into engagement with a valve seat 111. The spring 116 is positioned between an internal wall 120 of the valve main body 100 and an abutting shoulder 122 in the retainer member 114.

The axial movement of the main body portion 100 ensures proper alignment of the ball 92 in relation to the seat 111, when the back pressure forces the valve member main body 100, and thereby the ball 92, into the seated position, closing the valve, as shown in FIG. 10.

A split ring 118 locks into a transverse groove 124 formed in the interior wall 110 of the housing 112 and limits the movement of the valve member within the housing 112.

Many changes and modifications can be made within the design of the present invention without departing from the spirit thereof. I, therefore, pray that my rights to the present invention be limited only by the scope of the appended claims.

I claim:
1. A check valve, comprising:
a housing having a central fluid flow passageway extending therethrough, said housing having an interior wall which is provided with a plurality of longitudinal grooves extending in a substantially parallel relationship to a central longitudinal axis of the housing;
a valve member movable in a limited manner inside the housing between a position sealing fluid communication through the central passageway and a position permitting a fluid flow through the central passageway, said valve member comprising a tapered stem, the exterior surface of which defines a conically-shaped groove adapted for receiving a sealing means therein.

2. The device of claim 1, wherein said valve member comprises a conical forward end which is adapted to seat against a matchingly inclined seat formed in the interior wall of the housing a distance from said longitudinal grooves.

3. The device of claim 2, wherein said central passageway has a reduced diameter portion and a conical valve seat is formed adjacent that reduced portion.

4. The device of claim 1, wherein said valve member comprises a conical valve head which fittingly engages the valve seat when the valve is in a closed position, a conical stem integrally connected to said valve head, a resilient flexible sealing means for sealing an area about said valve head when the valve is in a closed position, an enlarged diameter generally cylindrical neck portion integrally formed with the stem, and a main body portion having a diameter slightly smaller than a diameter of an interior wall, said main body forming a shoulder which limits movement of said sealing means within said central passageway.

5. The device of claim 4, wherein said sealing means is mounted in circumferential relationship about said stem and is allowed to travel along the neck, when expanded.

6. The device of claim 4, wherein said main body portion has a central opening extending through at least a portion thereof and a transverse port formed in fluid communication with the central opening.

7. The device of claim 1, further comprising a compression spring means for urging the valve member into engagement with the valve seat.

8. The device of claim 7 further comprising a retaining means provided with an abutting surface for receiving an opposite end of the spring means.

9. The device of claim 8 wherein said housing is formed with an annular groove in an inner wall thereof a distance from the valve seat.

10. The device of claim 9, further comprising a resilient snap ring which is positioned in the annular groove and abuts a free end of the retaining means.

11. The device of claim 8, wherein said valve member has a longitudinal central opening formed in a main body thereof, and said compression spring means is mounted within said central opening.

12. The device of claim 1, further comprising a locking means for locking position of the retaining means within said central fluid passageway.

13. The device of claim 12, wherein said locking means is a split ring mounted in a transverse groove formed in an interior wall of the housing a distance from said valve seat.

14. The device of claim 1, wherein said valve member comprises a main body fittingly engaged in the central passageway, and a reduced diameter neck integrally attached to the main body.

15. The device of claim 14, wherein said main body is provided with a central opening extending substantially co-axially to a longitudinal axis of the valve member, and said neck is provided with a transverse port in fluid communication with the central opening.

16. A check valve, comprising:
a housing having a central fluid flow passageway extending therethrough, said central passageway having a reduced diameter portion provided with a conical valve seat formed adjacent that reduced diameter portion, and an annular groove formed in a transverse relationship to a longitudinal axis of the housing, said housing being provided with a plurality of equidistantly spaced longitudinal grooves formed in an inner wall of the housing and extending through at least a part thereof;
a valve member movable in a limited manner in said housing between a position sealing fluid communication through the central passageway and a position permitting a fluid flow through the central passageway, said valve member having a conical forward end to fittingly engage the valve seat when the valve is in a closed position, a tapered valve stem for receiving a sealing means in circumferential relationship thereto integrally connected to the forward end;

a resilient flexible sealing member mounted in a groove defined by an exterior surface of the stem;

a compression spring means urging the valve member into engagement with the valve seat;

a retaining means provided with an abutting surface for receiving an opposite end of the spring means; and a resilient snap ring which is positioned within the annular groove of the housing and abuts a free end of the retaining means.

17. The device of claim 16, wherein said main body portion has a central opening which extends through at least a portion thereof and a transverse port in fluid communication with the central opening.

18. A check valve, comprising:

a housing having a central fluid flow passageway extending therethrough, said housing having a conical valve seat and an interior wall, said interior wall being formed with a plurality of equidistantly spaced longitudinal grooves oriented in substantially parallel relationship to a central longitudinal axis of the housing, said grooves extending a distance from said conical valve seat;

a valve member movable in a limited manner inside the housing between a position sealing fluid communication through the central passageway and a position permitting a fluid flow through the central passageway, said valve member comprising a conical valve head which fittingly engages the valve seat when the valve is in a closed -position, a reduced diameter tapered stem having an exterior surface which defines a primary groove for receiving a sealing member therein, an enlarged diameter cylindrical neck integrally connected to the stem, and a main body portion which fittingly engages the interior wall of the housing, said main body being integrally attached to the neck of the valve member; and an O-ring positioned within the groove defined by the stem of the valve member and allowed to travel along the neck, when expanded.

19. The device of claim 18, wherein said main body defines an annular shoulder which limits movement of the O-ring within the housing.

20. The device of claim 18, further comprising a compression spring means for urging said valve member to a seated position against the valve seat.

21. The device of claim 20, wherein said compression spring means contacts an end plate of the main body opposite said valve head.

22. The device of claim 21, further comprising a retaining means for engaging a free end of said compression spring means.

23. The device of claim 22, wherein said housing is provided with an annular groove adjacent one of its ends.

24. The device of claim 23, wherein a resilient snap ring contacts said retaining means opposite said compression spring means, said snap ring engaging the annular groove of the housing.

25. A check valve, comprising:

a housing having a central fluid flow passageway extending therethrough, said housing having an interior wall which is provided with a plurality of longitudinal grooves extending in a substantially parallel relationship to a central longitudinal axis of the housing;

a valve member movable in a limited manner inside the housing between a position sealing fluid communication through the central passageway and a position permitting a fluid flow through the central passageway, said valve member comprising a conical valve head which fittingly engages the valve seat when the valve is in a closed position, a conical stem integrally connected to said valve head, a resilient flexible sealing means for sealing an area about said valve head when the valve is in a closed position, an enlarged diameter generally cylindrical neck portion integrally formed with the stem, and a main body portion having a diameter slightly small than a diameter of an interior wall, said main body forming a shoulder which limits movement of said sealing means with said passageway.

26. The device of claim 25, wherein said sealing means is mounted in circumferential relationship about said stem and is allowed to travel along the neck, when expanded.

27. The device of claim 25, wherein said main body portion has a central opening extending through at least a portion thereof and a transverse port formed in fluid communication with the central opening.

28. A check valve, comprising:

a housing having a central fluid flow passageway extending therethrough, said housing having an interior wall which is provided with a plurality of longitudinal grooves extending in a substantially parallel relationship to a central longitudinal axis of the housing;

a valve member movable in a limited manner inside the housing between a position sealing fluid communication through the central passageway and a position permitting fluid flow through the central passageway, said valve member comprising a main body fittingly engaged in the central passageway and a reduced diameter neck integrally attached to the main body, said main body being provided with a central opening extending substantially co-axially to a longitudinal axis of the valve member, and said neck is provided with a transverse port in fluid communication with the central opening.

* * * * *